(12) United States Patent
Diss et al.

(10) Patent No.: US 9,416,059 B2
(45) Date of Patent: Aug. 16, 2016

(54) PROTECTION AGAINST THE OXIDATION OF COMPOSITE MATERIALS CONTAINING CARBON

(75) Inventors: Pascal Diss, Le Haillan (FR); Eric Lavasserie, Begles (FR)

(73) Assignee: Snecma Propulsion Solide, LeHaillan (FR)

( * ) Notice: Subject to any disclaimer, the term of this patent is extended or adjusted under 35 U.S.C. 154(b) by 52 days.

(21) Appl. No.: 12/094,637

(22) PCT Filed: Nov. 28, 2006

(86) PCT No.: PCT/FR2006/051238
§ 371 (c)(1),
(2), (4) Date: May 22, 2008

(87) PCT Pub. No.: WO2007/063243
PCT Pub. Date: Jun. 7, 2007

(65) Prior Publication Data
US 2008/0311301 A1 Dec. 18, 2008

(30) Foreign Application Priority Data
Nov. 29, 2005 (FR) ...................................... 05 12060

(51) Int. Cl.
| | |
|---|---|
| B05D 5/12 | (2006.01) |
| C04B 41/85 | (2006.01) |
| C04B 41/00 | (2006.01) |
| C04B 41/50 | (2006.01) |
| C04B 41/52 | (2006.01) |
| C04B 41/89 | (2006.01) |
| F16D 69/02 | (2006.01) |
| C04B 111/00 | (2006.01) |

(52) U.S. Cl.
CPC ............... *C04B 41/85* (2013.01); *C04B 41/009* (2013.01); *C04B 41/5092* (2013.01); *C04B 41/52* (2013.01); *C04B 41/89* (2013.01); *F16D 69/023* (2013.01); *C04B 2111/00362* (2013.01); *F16D 2250/0038* (2013.01)

(58) Field of Classification Search
USPC .................... 427/314, 376.2, 397.7, 421.1
See application file for complete search history.

(56) References Cited

U.S. PATENT DOCUMENTS

| | | | | |
|---|---|---|---|---|
| 4,790,052 A | | 12/1988 | Olry | |
| 5,364,513 A | * | 11/1994 | Sekhar et al. | 204/290.02 |
| 5,420,084 A | * | 5/1995 | Morel | 501/96.3 |
| 5,853,821 A | | 12/1998 | Balhadere et al. | |
| 6,740,408 B2 | | 5/2004 | Thebault et al. | |

(Continued)

FOREIGN PATENT DOCUMENTS

| | | |
|---|---|---|
| EP | 0 606 851 B1 | 4/1997 |
| EP | 0 677 499 B1 | 6/1998 |
| EP | 0 747 334 B1 | 10/2002 |

(Continued)

*Primary Examiner* — Austin Murata
(74) *Attorney, Agent, or Firm* — Preti Flaherty Beliveau & Pachios LLP

(57) ABSTRACT

A part made of a porous material containing carbon, in particular a C/C composite material, is protected against oxidation by being impregnated with a composition in an aqueous medium containing at least a phosphorous compound, elemental titanium, and boron or a boron compound other than titanium diboride, to form in the presence of oxygen and at least one alkali or alkaline-earth element M that catalyzes oxidation of carbon, at least one P—O—Ti-M type association bonded by boron oxide $B_2O_3$ and trapping the element M.

6 Claims, 6 Drawing Sheets

(56) References Cited

U.S. PATENT DOCUMENTS

2005/0204637 A1* 9/2005 Tamai et al. ............... 51/298
2006/0154555 A1* 7/2006 Gomzar .................. 446/19

FOREIGN PATENT DOCUMENTS

| WO | WO 2004/112932 | * 12/2004 |
| WO | WO 2005/012744 | 2/2005 |

* cited by examiner

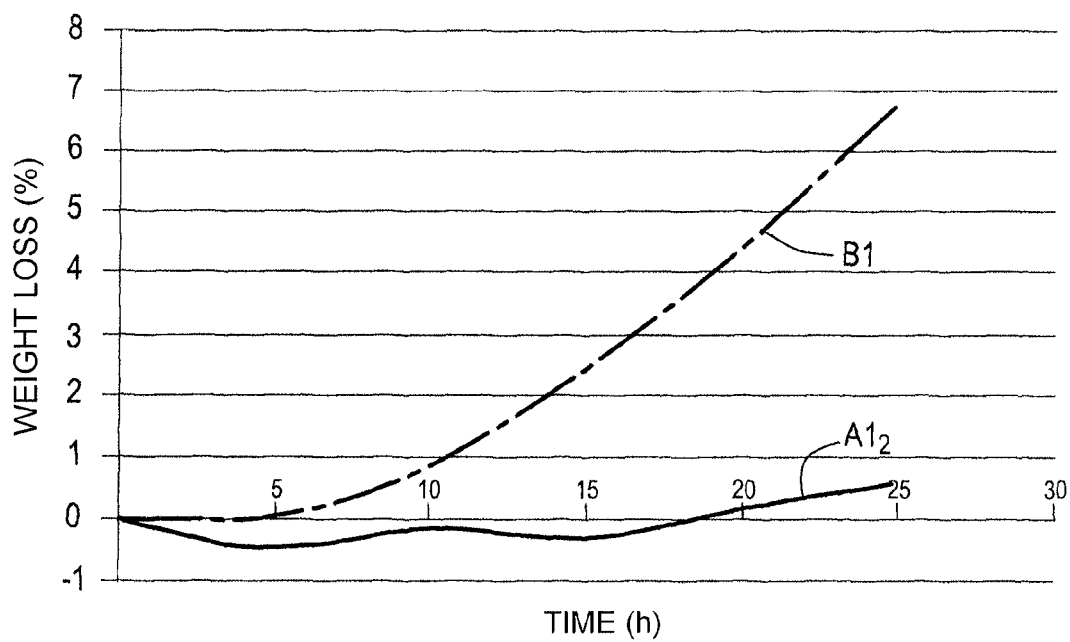
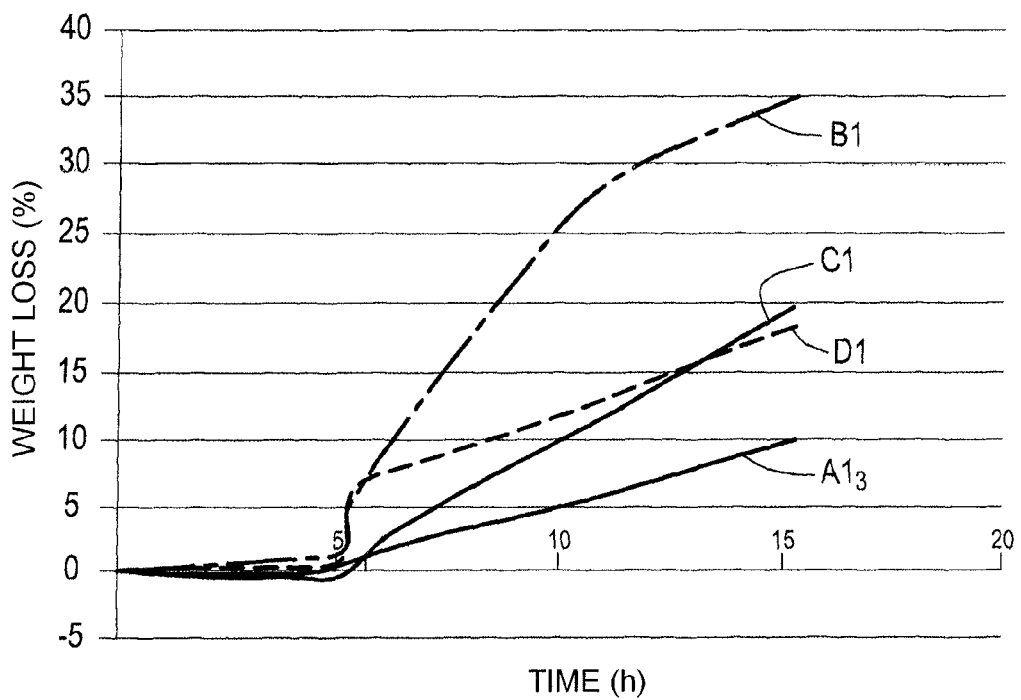

PROTECTION AGAINST THE OXIDATION OF COMPOSITE MATERIALS CONTAINING CARBON

This application is a §371 national phase filing of PCT/FR2006/051238 filed Nov. 28, 2006, and claims priority to French application No. 05 12060 filed Nov. 29, 2005.

BACKGROUND OF THE INVENTION

The invention relates to protecting composite material parts containing carbon against oxidation, in particular parts made of thermostructural composite material comprising carbon fiber reinforcement densified by a matrix made at least in part out of carbon.

Thermostructural composite materials are characterized by their good mechanical properties and by their ability to conserve those properties at high temperatures. Nevertheless, in an oxidizing medium, this capacity to conserve good mechanical properties at high temperatures is conditional on having effective protection against oxidation. Indeed, whatever the way in which such materials are prepared, they inevitably present residual internal open pores that provide oxygen in the surrounding medium access to the core of the material.

In addition, in certain applications, and in particular brake disks made of carbon/carbon (C/C) composite material as used in aviation, the protection against oxidation must continue to be effective in the presence of oxidation catalysts (that are present in de-icing agents used on runways) and also in the presence of moisture (landing and taxiing on wet surfaces).

For this purpose, it is well known to use protections based on aluminum phosphate, or more generally based on metal phosphates singly or in combination, such as phosphates of aluminum and of zinc. Deposition on the parts to be protected can be controlled in terms of quantity and geometrical distribution, e.g. to avoid applying the protective composition on certain portions of parts such as the rubbing surfaces of brake disks where the presence of the protective composition might affect tribological properties. Advantageously, a surface active agent is used that encourages the protective composition to penetrate in depth and that is applied either beforehand or mixed directly with the protective composition, and the composition is applied in the same manner as paint is applied. Reference can be made for example to the following documents: U.S. Pat. No. 5,853,821; EP 0 747 334; EP 0 677 499; EP 0 606 851; and US 2004/0020728. In the last of those documents, hydrated boron oxide may be present in small quantities together with phosphoric acid and phosphates, as can titanium oxide $TiO_2$, which is present solely to impart a white color to the coating so that it can be seen. The properties of $TiO_2$ mean that it cannot contribute to improving the protective potential of the system, whether by softening to generate a protective film—given that the melting point of $TiO_2$ is about 1850° C., whereas the expected utilization temperatures do not exceed 1600° F., i.e. about 870° C.—or by chemical combination with the other species present, given its stability.

Under all circumstances, the effectiveness of such compositions is limited above a certain temperature threshold, about 1000° C., beyond which their active phosphate compounds decompose.

To improve behavior above that threshold, it is possible to combine protection against oxidation based on metallic phosphate(s) with diffusion barriers that oppose oxygen gaining access to the composite material at high temperatures, such as healing vitreous phases or leakproof outer layers, e.g. outer layers of silicon carbide (SiC) obtained by chemical vapor deposition or by applying a liquid composition containing silicon carbide in suspension, or a silicon carbide precursor (such as a resin of the polycarbosilane (PCS) type diluted in an organic solvent and transformed into silicon carbide by heat treatment). In particular, reference can be made to document U.S. Pat. No. 6,740,408, which describes the formation of a healing vitreous phase by applying a composition containing a mixture of titanium diboride powder $TiB_2$, vitreous refractory oxide powder constituted for the most part by a borosilicate mixture, an SiC precursor resin, and an organic solvent for the resin.

Nevertheless, providing protection against oxidation is then more complex, since the protection is made up of two superposed layers, each requiring a specific process for putting it into place. In addition, the use of an organic solvent leads to problems in terms of safety and environment.

In order to remedy those drawbacks, proposals are made in document WO 05/012744 to use an impregnation composition containing at least one metallic phosphate in solution, titanium diboride powder ($TiB_2$), and possibly other solid fillers.

$TiB_2$ behaves as a reservoir acting very progressively to form $B_2O_3$ that is capable of conferring to the protection against oxidation the character of a diffusion barrier against oxygen in the surrounding medium. By generating $B_2O_2$ very progressively, it becomes possible to compensate for its elimination by volatilization above 1000° C. and to ensure that effective protection remains in existence up to 1400° C. or more. Furthermore, by being associated with the oxygen and the element phosphorous P present in the composition, and in the presence of an element M that catalyzes carbon oxidation and coming from the outside, $TiB_2$ is capable of forming complex oxides of the P—O—Ti-M type. The formation of such complex oxides thus enables the oxidation catalysts coming from the outside to be trapped in the form of a glass, i.e. above 1000° C. The glass as formed in this way also contributes to the oxygen diffusion barrier effect, up to at least 1400° C., while also being insoluble in water, i.e. while making it possible to obtain protection that is stable in a wet medium.

Nevertheless, it is found that incorporating $TiB_2$ in an aqueous solution of metallic phosphate(s) is accompanied by a large amount of irritating and malodorous gas being given off and results in a suspension that has a short working lifetime, and that can therefore not be prepared in advance and stored, since its viscosity increases rapidly.

OBJECT AND SUMMARY OF THE INVENTION

An object of the invention is to provide a method enabling parts made of composite materials containing carbon to be protected effectively against oxidation, including in the presence of catalysts for carbon oxidation, in the presence of moisture, and in the event of being exposed to high temperatures above 1000° C., while still being easy to implement without the above-mentioned drawbacks.

In accordance with the invention, this object is achieved by a method in which an impregnation composition is used that contains at least one phosphorous compound, elemental titanium, and boron or a boron compound other than titanium diboride, to form in the presence of oxygen and at least one alkali or alkaline-earth element M that catalyses the oxidation of carbon, at least one P—O—Ti-M type association bonded by boron oxide $B_2O_3$ and trapping the element M.

The use of elemental titanium is particularly advantageous because its reactivity encourages the formation of the looked-for association of the P—O—Ti-M type.

According to a feature of the method, at least one element M is introduced into the impregnation composition, e.g. in the form of an alkali or an alkaline-earth salt. This immediately produces at least one P—O—Ti-M type association imparting the capacity to protect above 1000° C. during initial use of the protected part.

The elemental titanium is advantageously introduced into the impregnation composition merely in the form of titanium powder. Similarly, the boron can be introduced into the impregnation composition merely in the form of elemental boron powder.

According to yet another feature of the method, after impregnation, heat treatment is performed at a temperature lying in the range 350° C. to 750° C.

The impregnation composition may also contain refractory solid fillers such as fillers of silica, alumina, clay (in particular kaolin), and talc, advantageously in powder form.

The impregnation composition may contain, in percentages by weight:
  3% to 45% metallic phosphate(s) and/or phosphoric acid;
  1% to 20% titanium powder;
  5% to 50% boron powder;
  1% to 20% of an alkali or an alkaline-earth salt;
  0% to 40% of other refractory solid fillers; and
  10% to 90% water.

According to yet another feature of the method, it includes a preliminary stage of treating the part with a solution containing a surface active agent and drying it so as to confer wettability to the composite material that is increased by the presence of the surface active agent.

BRIEF DESCRIPTION OF THE DRAWINGS

Other features and advantages of the invention appear on reading the following description made by way of non-limiting indication with reference to the accompanying drawings, in which:

FIGS. 2 to 11 show curves representing the weight loss from C/C composite material samples provided with protection against oxidation in accordance with the invention or in accordance with the prior art and subjected to oxidation tests under a variety of conditions.

DETAILED DESCRIPTION OF IMPLEMENTATIONS OF THE INVENTION

The invention applies to parts made of composite material containing carbon, i.e. parts constituted by fiber reinforcement densified by a matrix, in which the fibers of the reinforcement and/or the matrix are made at least in part out of carbon. Typically such parts are C/C composite material parts or composite material parts having carbon fiber reinforcement and a ceramic matrix or a combined ceramic and carbon matrix. Examples of such parts are brake disks, in particular brake disks for airplanes.

The preparation of composite material parts of this type comprises forming a reinforcing fiber structure and densifying it with a matrix. Densification can be performed by using a liquid technique, i.e. impregnating the reinforcing fibers with a liquid composition containing a precursor for the matrix, e.g. a composition containing a resin, and by transforming the precursor by heat treatment. Densification can also be performed by using a gas technique, i.e. chemical vapor infiltration.

Whatever the technique used, the composite material obtained presents residual internal open pores, i.e. a set of intercommunicating pores within the thickness of the material.

Providing protection against oxidation by impregnation using a liquid composition then consists in surface coating accessible pores of the composite material to a certain depth from a surface of the part onto which the composition is applied.

Figure 1:
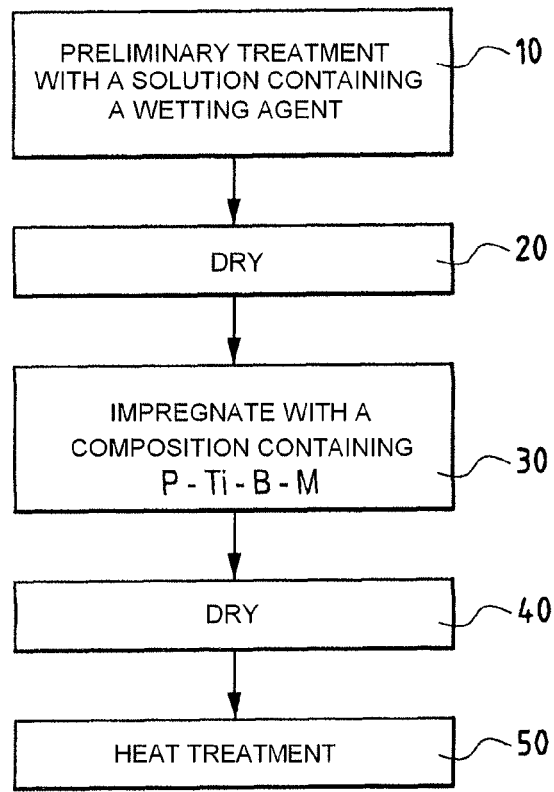
FIG. 1 is a flow chart showing an implementation of the method of the invention.
Figure 2:
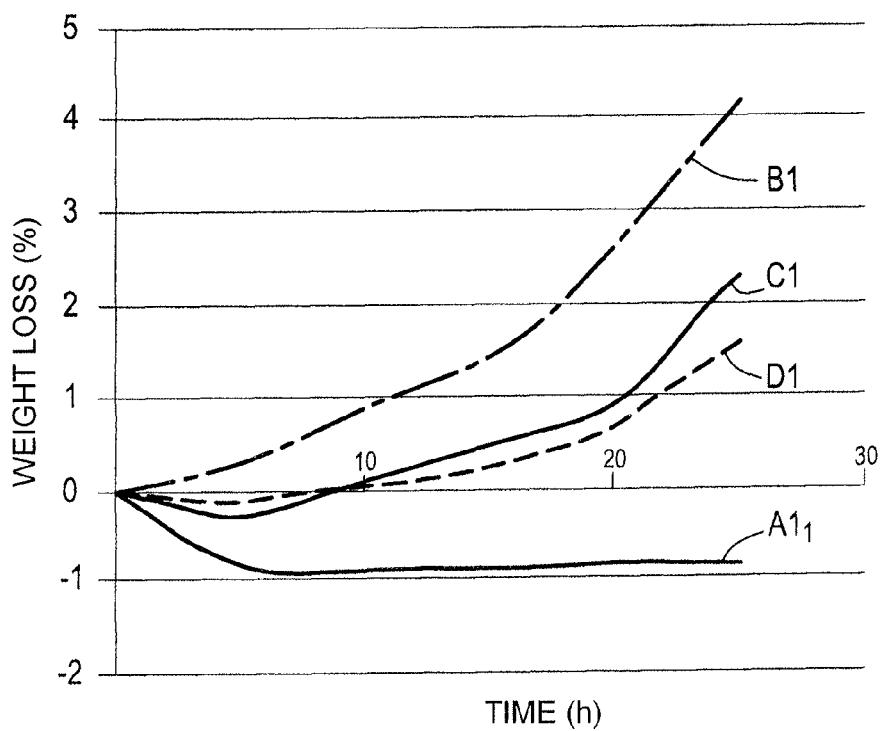
Figure 5:
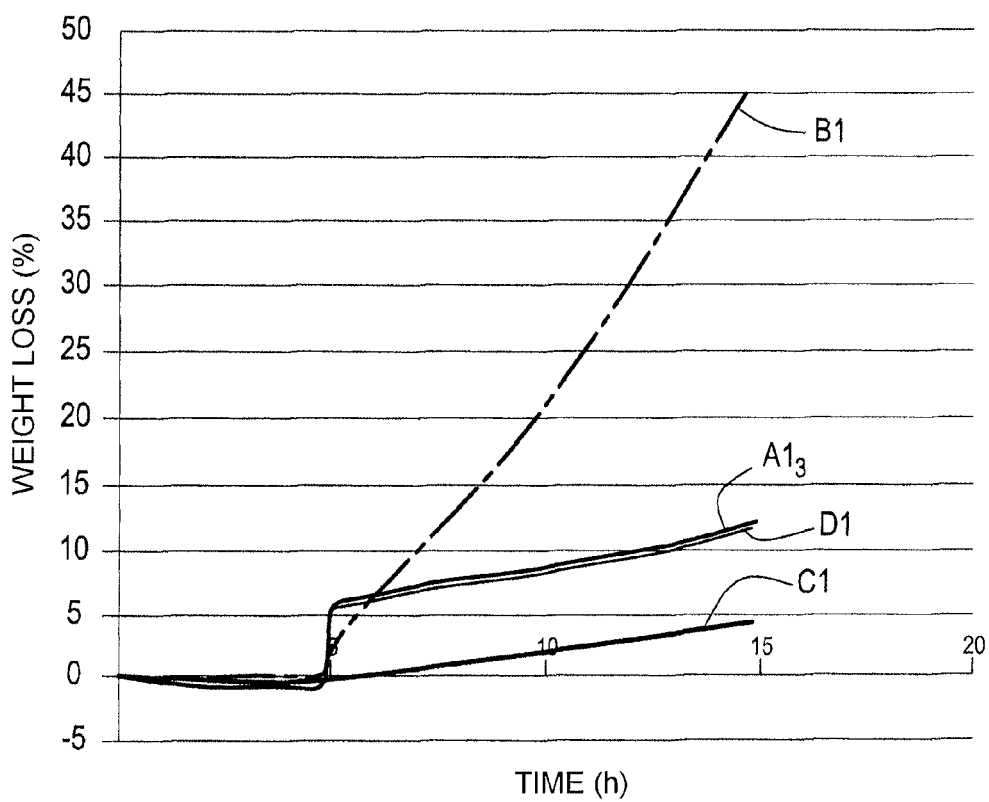

In the implementation of FIG. 1, a first stage of the method consists in performing treatment in depth in the part using an aqueous solution that penetrates within the open pores of the material (step 10) and containing a surface active agent or wetting agent. After drying (step 20), the surface active agent present on the surfaces of the pores in the material serves to increase the wettability thereof.

Such a preliminary stage of in-depth treatment of the part is described in above-mentioned document U.S. Pat. No. 5,853,821.

Advantageously, the surface active agent used is soluble in water and is not ionic, such as an oxyethylene fatty acid, an oxyethylene fatty alcohol, an oxyethylene alkyl-phenol, or a higher poly-ol ester. The surface active agent is added to water at a proportion preferably lying in the range 0.05% to 5% by weight of water so as to conserve the fluidity of the aqueous solution, enabling it to penetrate easily to the core of the material.

The preliminary treatment of the part can also be performed to clean the composite material. For this purpose, the part is, for example, immersed in an ultrasound vessel containing the surface active agent in aqueous solution.

After the preliminary treatment, a step 30 is performed of impregnating the composite material part with a composition in an aqueous medium containing at least one phosphorous compound in solution in water, elemental titanium Ti, boron or a boron compound other than $TiB_2$, and an alkali or alkaline-earth element M that catalyzes oxidation of carbon, or a compound of an element M.

The phosphorous compound may be phosphoric acid, or preferably one or more metallic phosphates selected from phosphates of aluminum, of zinc, of manganese, . . . . . Advantageously, aluminum dihydrogen phosphate $Al(H_2PO_4)_3$ is used.

The elemental titanium is advantageously introduced in the form of titanium metal powder.

The boron is preferably introduced in the form of powdered elemental boron. It is also possible to use a powder of a boron compound other than $TiB_2$, e.g. $B_2O_3$, or any compound that makes it possible to form an association of the P—O—Ti-M type without disturbing the stability of the impregnation composition.

By way of example, the element M is selected from sodium, potassium, calcium, magnesium, and manganese. It is preferably introduced in the form of a salt such as a phosphate, a chloride, or an acetate, dissolved in the aqueous composition, it being observed that any salt capable of enabling the P—O—Ti-M association to be formed without disturbing the stability of the composition can be suitable.

Additional solid refractory fillers can be introduced into the impregnation composition. These fillers contribute in particular to filling in the pores of the composite material. They may be selected from powders of silica, alumina, clay (in particular kaolin), and talc.

In order to conserve the capacity to impregnate in depth in the composite material, the mean grain size of the powder introduced into the impregnation composition preferably lies in the range 0.1 micrometers ($\mu$m) to 200 $\mu$m.

Typically, the impregnation composition contains, in percentages by weight:
- 3% to 45% and preferably 20% to 40% metallic phosphate(s) and/or phosphoric acid;
- 1% to 20% and preferably 5% to 20% titanium powder;
- 5% to 50% and preferably 5% to 20% boron powder;
- 1% to 20% and preferably 5% to 20% of an alkali or an alkaline-earth salt;
- 0% to 40% and preferably 0% to 10% of other refractory solid fillers; and
- 10% to 90% and preferably 20% to 40% water.

Preparation of the impregnation composition does not give rise to any irritating or nauseating gas being given off of the kind that is encountered when implementing the above-mentioned prior art method. In addition, the composition is sufficiently stable to be capable of being conserved for several tens of hours without an increase in viscosity that could interfere with use thereof.

In step 30, the impregnation composition is applied to the surface of the composite material part. Application can be performed under atmospheric pressure, e.g. by painting with a brush or by spraying. There is no need to make use of high pressure or a vacuum in order to force the impregnation composition to penetrate deeply under the effect of a pressure difference. Furthermore, the impregnation composition can easily be applied selectively to certain portions only of the part. With brake disks, that makes it possible to avoid applying the protection against oxidation to the rubbing faces since otherwise that might interfere with its tribological behavior.

Step 30 can be repeated several times consecutively.

After step 30, drying is performed, e.g. in a stove in air at up to about 350° C. (step 40), leaving a protective layer on those surfaces that have been wetted by the impregnation composition.

After drying, the part can be subjected to heat treatment in an oven under an inert atmosphere, e.g. a nitrogen atmosphere (step 50), thus making it possible to finish off forming the active compound for providing protection against catalytic oxidation of carbon. The heat treatment can be performed by raising the temperature up to about 700° C. to 900° C.

It should be observed that the preliminary stage (steps 10, 20) is optional, but enhances impregnation to the core within the material.

The examples given below show that parts that have been protected in accordance with the invention present a clear improvement in behavior in an oxidizing medium in comparison with the prior art, and that this applies with exposures to very high temperatures (1000° C. or more), in the presence of moisture, and in the presence of catalysts for carbon oxidation. This remarkable performance is in addition to the advantages presented by the impregnation composition in terms of working (stability and no gases given off).

The presence of the elements P and Ti makes it possible in association with the oxygen of the ambient medium and in the presence of the carbon oxidation catalyst element M, to form associations or complex oxides of the P—O—Ti-M type that are capable of relaying to above 1000° C. the protective action of phosphorous compounds on their own, in particular metallic phosphates, while also trapping the element M. Because of these "relay-species", effective protection can be obtained over a broad range of temperatures, e.g. extending from 650° C. to 1400° C. Formation of the P—O—Ti-M type association is enhanced by the reactivity of the elemental titanium that is present.

In the detailed description above, at least one element M is introduced immediately into the impregnation composition. Nevertheless, it is possible to envisage omitting such an element M from the impregnation composition, with the P—O—Ti-M type association(s) being formed in the presence of one or more elements M delivered by external agents.

Nevertheless, it should be observed that the presence of at least one element M in the impregnation composition enables P—O—Ti-M type association(s) to be formed in the protection as initially put into place. This has the advantage of making it possible to target the effectiveness of the protection better if the protection needs to be reinforced at particular temperatures.

The element boron present in the impregnation composition provides better wettability for the surfaces of the pores in the composite material, in particular carbon surfaces, and thus ensures good bonding with the protective layer that is formed. The element boron reacts with oxygen in the ambient medium to form the oxide $B_2O_3$, which acts as a binder for the P—O—Ti-M type associations and contributes to the oxygen diffusion barrier effect. In spite of this presence of $B_2O_3$, which is itself attacked by water, protected parts are nevertheless observed to behave very well in the presence of water, it being plausible that this is because of the poor solubility of P—O—Ti-M associations.

Example 1

Samples of C/C composite material were made as follows.

Unidirectional fiber sheets of carbon precursor fibers (preoxidized polyacrylonitrile) were superposed in various directions and bonded together by needling progressively as they were being superposed. The fiber preform obtained in that way was subjected to heat treatment to transform the precursor into carbon by pyrolysis, and was then densified with a pyrolytic carbon matrix by means of chemical vapor infiltration. Such a method is itself well known. Reference can be made in particular to document U.S. Pat. No. 4,790,052. Samples were cut from the resulting block of C/C material.

A plurality of samples were provided with protection against oxidation by a process comprising the following steps:

a) preliminary treatment of the samples by immersion in an ultrasound vessel containing an aqueous solution of a surface active agent based on polyethoxyl isononyl-phenol as available from the German supplier Hüls under the name "Marlophen NP9", the surface active agent being present in the solution at a concentration of 5% by weight. After impregnation, the samples were dried in a stove at about 90° C., leaving the pores of the composite material lined with surface active agent;

b) using a paint brush to apply to the faces of the samples an aqueous solution containing: 32.05% by weight $Al(H_2PO_4)_3$; 15.4% by weight of elemental titanium powder; 15.4% by weight of elemental boron powder; 5.1% by weight of potassium dihydrogen phosphate $KH_2PO_4$; and 32.05% by weight water; and c) drying in a stove in air with temperature rising slowly up to about 350° C.

Samples A1 ($A1_1$, $A1_2$, $A1_3$, and $A1_4$) as protected in this way in accordance with the invention were subjected to the following respective oxidation tests:

I) exposure in air at 650° C. for six times 5 hours (with weight being measured at the end of each 5-hour period);

II) exposure in air at 650° C. for 5 hours at 650° C., immersion for 24 hours in water at ambient temperature, draining and exposure to air at 650° C. for four times 5 hours (with weight being measured at the end of each 5-hour period of exposure to air);

III) exposure to air at 650° C. for 5 hours, exposure to air at 1200° C. for 20 minutes, "pollution" with potassium acetate (by vacuum impregnation with a 5% by weight solution of potassium acetate) and exposure to air at 650° C. for twice 5 hours (with weight being measured at the end of the first 5-hour period, at the end of the 20-minute period, and at the ends of the last two 5-hour periods); and IV) exposure to air at 650° C. for 5 hours, exposure to air at 1400° C. for 10 minutes, and exposure to air at 650° C. for twice 5 hours (with weight being measured at the end of the first 5-hour period, at the end of the 10-minute period, and at the ends of the last two 5-hour periods).

By way of comparison, each test was also performed on samples of the same C/C composite material but protected using prior art methods, namely:

samples B1 obtained by performing a step a1) similar to step a) above followed by step b1) of using a paint brush to apply an aqueous solution containing 50% by weight $Al(H_2PO_4)_3$, the remainder being water; a drying step c1) similar to step c); and a heat treatment step d1) by raising the temperature up to 700° C. under nitrogen, in compliance with Example 1 of document U.S. Pat. No. 5,853,821;

samples C1 by providing the samples B1 with a protective coating by:

applying a layer of a composition containing, by weight: 49% of $TiB_2$; 12.8% of "Pyrex" glass powder; 19.1% silicone resin as sold by the German supplier Wacker Chemie under the reference "H62C"; and 19.1% of resin solvent (xylene);

curing the resin by heat treatment at 220° C. without a catalyst; and heat treatment for ceramizing the silicone resin at 900° C. under an inert atmosphere (in compliance with the highest performance samples 0 of Example 5 of document U.S. Pat. No. 6,740,408); and samples D1 by performing steps a2) and b2) similar to above steps a) and b1), and followed by:

a step b'2) of using a paint brush to apply an aqueous solution containing: 35% by weight $Al(H_2PO_4)_3$; and 44% by weight of $TiB_2$ powder, the remainder being water;

a drying step c2) similar to step c); and a heat treatment step d2) similar to step d1), in compliance with Example 1 of document WO 05/012744.

The curves of FIGS. 2 to 5 show the results obtained for tests I) to IV), respectively, for the samples A1 and for at least some of the samples B1, C1, and D1, the results being presented in terms of relative weight loss (percentage weight loss measured relative to the weight of the sample before the test).

In all cases, the oxidation-withstanding performance obtained by the method in accordance with the invention is remarkable, whether at very high temperatures (1200° C. and 1400° C.), in the presence of moisture, or in the presence of an agent for catalyzing carbon oxidation. It is only in test IV) (with exposure to 1400° C.) that slightly poorer performance is observed in comparison with the prior art method that consists in making separately an internal protection and an external protection.

Examples 2 to 5

Samples A1 to A5 were obtained by proceeding as for the samples A1 of Example 1, but adding after drying step c), a heat treatment step by raising the temperature up to 700° C. in a manner similar to step d1), and for samples A3 to A5, by replacing the 5.1% by weight of $KH_2PO_4$ in the impregnation composition with the same percentage by weight respectively of sodium dihydrogen phosphate $NaH_2PO_4$, sodium chloride NaCl, and magnesium chloride $MgCl_2$.

Figure 6:
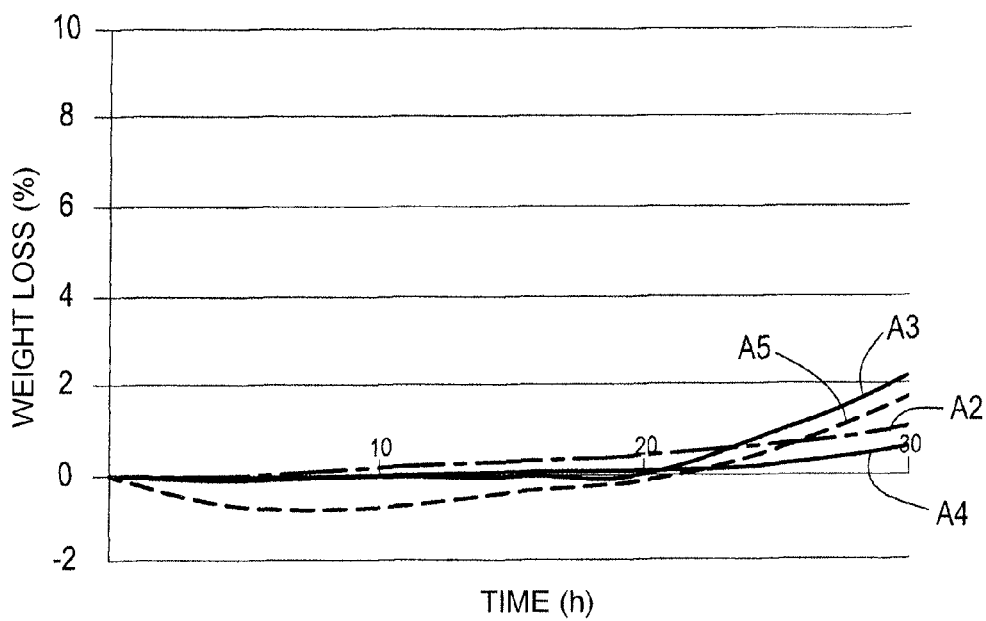

The curves of FIG. 6 show the results obtained (relative weight loss) for samples A2 to A5 when subjected to test I).

It can be seen that the performance of samples A2 to A5 is similar, and in comparison with the performance of samples A1 (FIG. 2) and A2, that heat treatment up to 700° C. does not provide any improvement.

Example 6

A sample A6 was obtained by proceeding as for sample A1, but while increasing the proportion by weight of titanium powder in the impregnation composition which then contained: 29% by weight of $Al(H_2PO_4)_3$; 23.3% by weight of titanium powder; 14% by weight of boron powder; 4.7% by weight of $KH_2PO_4$; and 29% by weight water.

Figure 7:
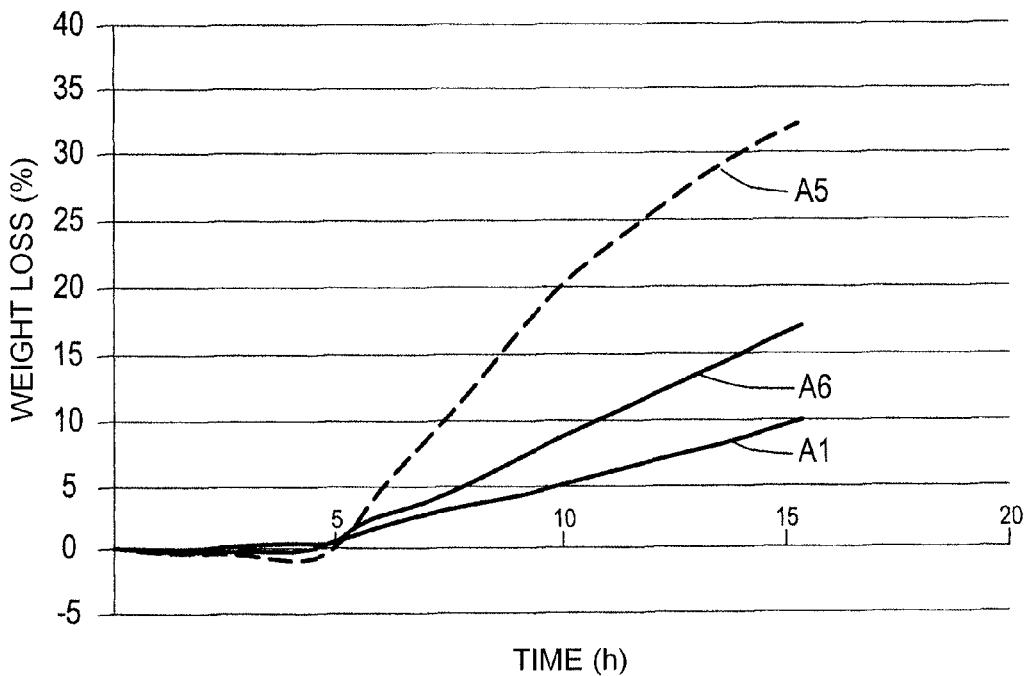

FIG. 7 shows the results obtained (relative weight losses) for samples A1 to A6 subjected to test III). FIG. 7 also shows the results obtained for a sample A5.

Comparing the results obtained with samples A1 and A6 shows a degradation in performance as a result of increasing the relative proportion of titanium.

Comparing the results obtained with samples A1 and A5 shows much better behavior in the presence of a compound of the potassium of sample A1 provided with protection initially incorporating a P—O—Ti—K association in comparison with the sample A5 provided with protection originally incorporating a P—O—Ti—Mg association, it being plausible that this is because of the shift in the range of effectiveness in terms of temperature (different softening points for passing to the viscous state).

Example 7

A sample A7 was obtained by proceeding as for sample A1, but replacing the $KH_2PO_4$ in the impregnation composition with $NaH_2PO_4$.

Figure 8:
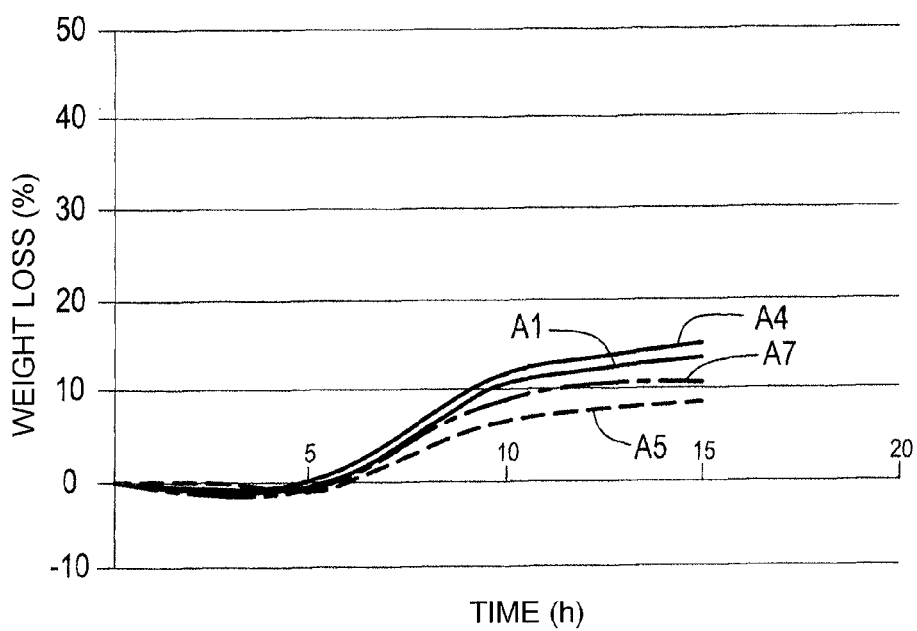

FIG. 8 shows the results obtained (relative weight loss) for samples A1 and A7 subjected to test IV). FIG. 8 also shows the results obtained for samples A4 and A5 (that were subjected to heat treatment up to 700° C.).

The results obtained are very similar to one another, showing that at very high temperature the nature of the element M and the performance or non-performance of heat treatment does not appear to have any influence on the effectiveness of the protection.

Example 8

Samples A8 were obtained ($A8_1$, $A8_2$, and $A8_3$) by proceeding as for the samples A1, but with an impregnation composition containing, by weight: 33.8% $Al(H_2PO_4)_3$; 10.8% titanium powder; 16.2% boron powder; 5.4% $AlK(SO_4)_2$ (aluminum and potassium sulfate); and 33.8% water.

Figure 9:
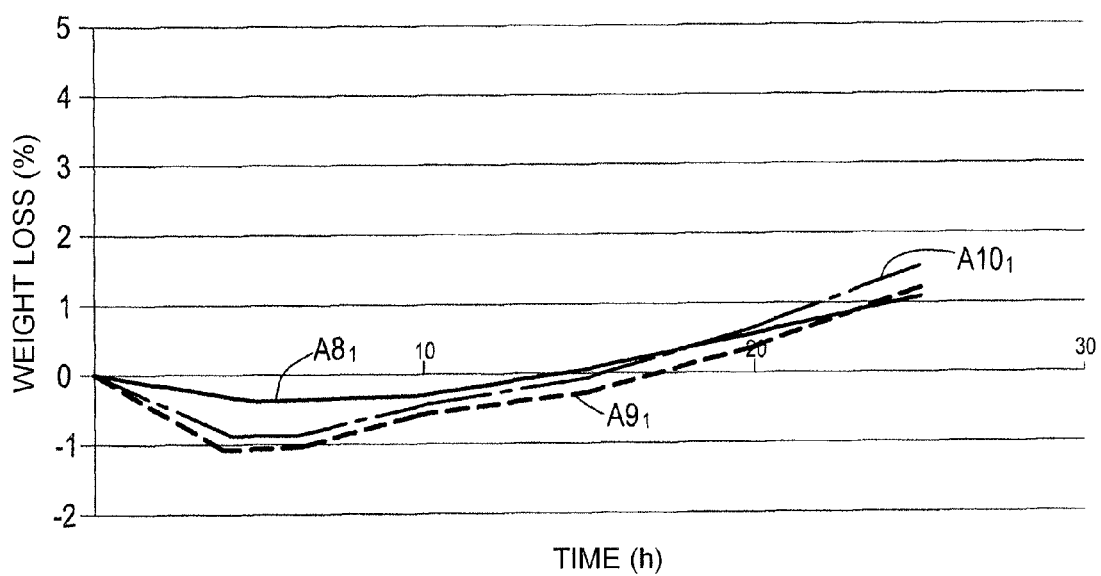
Figure 10:
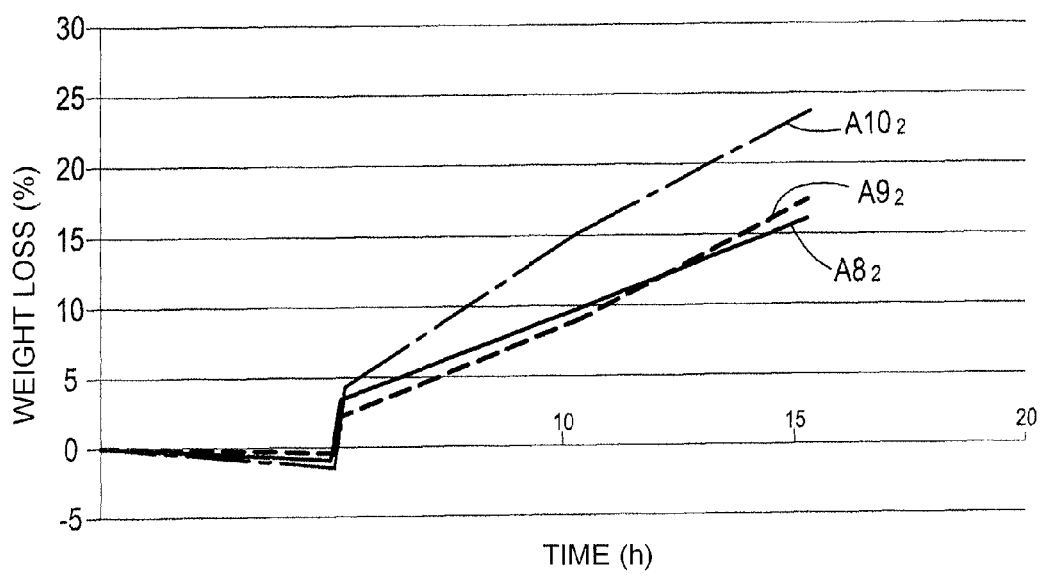
Figure 11:
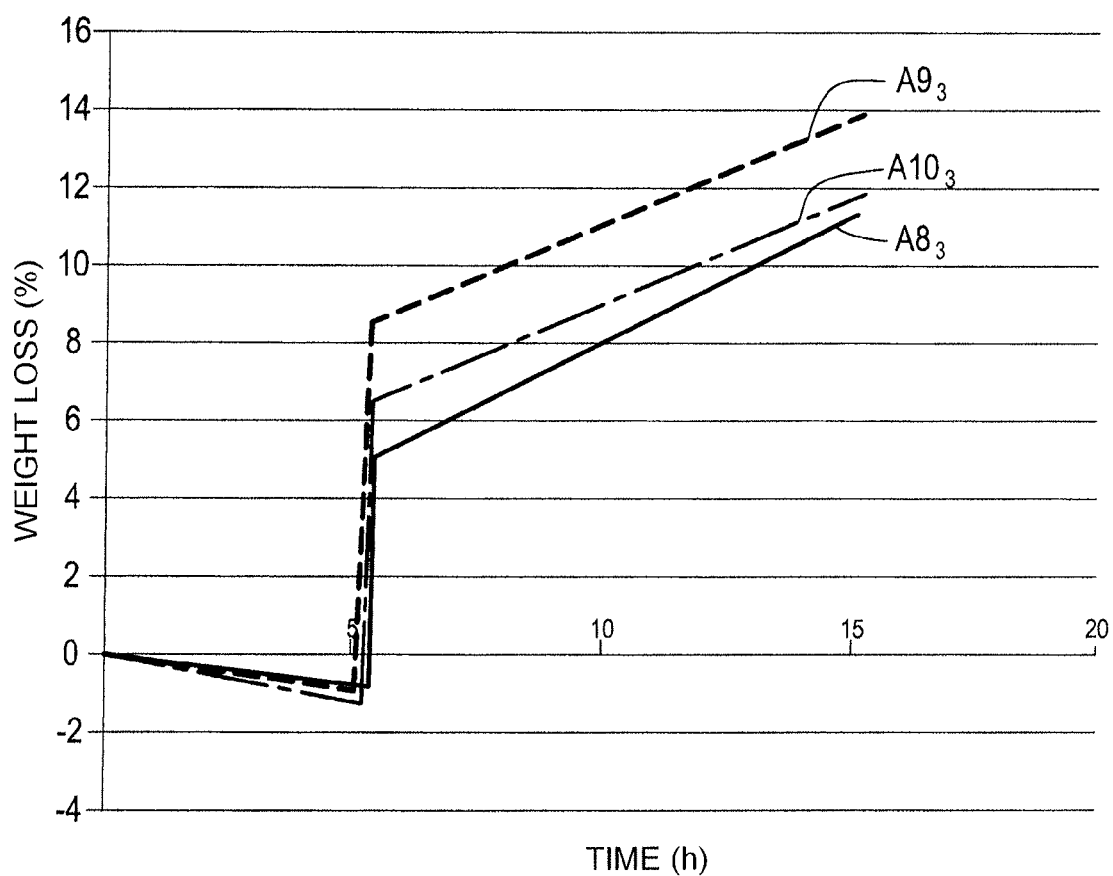

FIGS. 9, 10, and 11 show the results obtained (relative weight losses) for the samples A8 subjected to tests I), III), and IV), respectively.

Example 9

Samples A9 ($A9_1$, $A9_2$, and $A9_3$) were obtained by proceeding as for the samples A8 but replacing $AlK(SO_4)_2$ with NaI (sodium iodine) in the impregnation composition, the proportions by weight remaining the same.

FIGS. 9, 10, and 11 show the results obtained (relative weight losses) for the samples A9 subjected to tests I), III), and IV), respectively.

Example 10

Samples A10 ($A10_1$, $A10_2$, and $A10_3$) were obtained by proceeding as for the samples A8, but replacing $AlK(SO_4)_2$ with $Na_3C_6H_5O_7, 2H_2O$ (sodium citrate) in the impregnation composition, the proportions by weight remaining the same.

FIGS. 9, 10, and 11 show the results obtained (relative weight losses) for the samples A10 subjected to the tests I), III), and IV), respectively.

Examples 8, 9, and 10 in association with the preceding examples show the existence of a wide range of choices for the element M amongst alkali or alkaline-earth salts, while conserving good performance in terms of protection against oxidation.

The table below summarizes the conditions for obtaining samples A protected in accordance with the invention in the above examples. The indicated quantity of protection composition applied per unit area (milligrams per square centimeter (mg/cm$^2$)) applies to the quantity after performing heat treatment in the preparation of the sample (i.e. after drying in a stove at 350° C. or after subsequent heat treatment at 700° C. when that is performed).

TABLE

| Samples | Protection composition (% by weight) | Composition application density (mg/cm$^2$) | Heat treatment |
|---|---|---|---|
| $A1_1$ | 32.05% $Al(H_2PO_4)_3$ | 18.1 | 350° C. |
| $A1_2$ | 32.05% $H_2O$ | 19.1 | |
| $A1_3$ | 15.4% Ti powder | 18.9 | |
|  | 15.4% B powder | | |
| $A1_4$ | 5.1% $KH_2PO_4$ | 18.5 | |
| A2 | =A1 | 19.2 | 700° C. |
| A3 | 32.05% $Al(H_2PO_4)_3$ | 17.8 | 700° C. |
|  | 32.05% $H_2O$ | | |
|  | 15.4% Ti powder | | |
|  | 15.4% B powder | | |
|  | 5.1% $NaH_2PO_4$ | | |
| A4 | 32.05% $Al(H_2PO_4)_3$ | 19.2 | 700° C. |
|  | 32.05% $H_2O$ | | |
|  | 15.4% Ti powder | | |
|  | 15.4% B powder | | |
|  | 5.1% NaCl | | |
| A5 | 32.05% $Al(H_2PO_4)_3$ | 18.9 | 700° C. |
|  | 32.05% $H_2O$ | | |
|  | 15.4% Ti powder | | |
|  | 15.4% B powder | | |
|  | 5.1% $MgCl_2$ | | |
| A6 | 29% $Al(H_2PO_4)_3$ | 18.5 | 350° C. |
|  | 29% $H_2O$ | | |
|  | 23.3% Ti powder | | |
|  | 14% B powder | | |
|  | 4.7% $KH_2PO_4$ | | |
| A7 | =A3 | 17.9 | 350° C. |
| $A8_1$ | 33.8% $Al(H_2PO_4)_3$ | 16.7 | 350° C. |
|  | 33.8% $H_2O$ | | |
| $A8_2$ | 10.8% Ti powder | 15.8 | |
|  | 16.2% B powder | 15.1 | |
| $A8_3$ | 5.4% $AlK(SO_4)_2$ | | |
| $A9_1$ | 33.8% $Al(H_2PO_4)_3$ | 15.2 | 350° C. |
| $A9_2$ | 33.8% $H_2O$ | 14.9 | |
|  | 10.8% Ti powder | | |
| $A9_3$ | 16.2% B powder | 15.9 | |
|  | 5.4% NaI | | |
| $A10_1$ | 33.8% $Al(H_2PO_4)_3$ | 16.1 | 350° C. |
|  | 33.8% $H_2O$ | | |
| $A10_2$ | 10.8% Ti powder | 14.3 | |
|  | 16.2% B powder | | |
| $A10_3$ | 5.4% $Na_3C_6H_5O_7, 2H_2O$ | 15.7 | |

The invention claimed is:

1. A method of protecting a part made of porous materials containing carbon against oxidation when in use, including the presence of at least one alkali element M that catalyses the oxidation of carbon, the element M being selected from the group consisting of sodium and potassium, the method comprising impregnating the part with an impregnation composition in an aqueous medium free of titanium diboride and containing, in percentages by weight:
   20% to 40% aluminum phosphate;
   5% to 20% elemental titanium powder;
   5% to 20% elemental boron powder;
   5% to 20% of a potassium salt or a sodium salt; and
   water,
to form in the presence of oxygen and of said at least one alkali element M that catalyses the oxidation of carbon, at least one P—O—Ti-M type association bonded by boron oxide $B_2O_3$ and trapping the at least one element M.

2. A method according to claim 1, wherein after impregnation, heat treatment is performed at a temperature lying in the range 350° C. to 750° C.

3. A method according to claim 1, wherein the impregnation composition contains refractory solid fillers.

4. A method according to claim 1, further including a preliminary stage of treating the part with a solution containing a surface active agent and drying it so as to confer wettability to the composite material that is increased by the presence of the surface active agent.

5. The method according to claim 1, wherein the impregnation composition is selected to be sufficiently stable to be capable of being conserved for several tens of hours without an increase in viscosity.

6. The method accordingly to claim 1 further comprising preparing the impregnation composition without producing irritating or nauseating gases.

* * * * *